United States Patent [19]

Nakamura

[11] Patent Number: 5,378,091
[45] Date of Patent: Jan. 3, 1995

[54] METHOD AND APPARATUS FOR MACHINING A WORKPIECE

[75] Inventor: Makoto Nakamura, Kawasaki, Japan

[73] Assignee: Makino Milling Machine Co., Ltd., Tokyo, Japan

[21] Appl. No.: 72,229

[22] Filed: Jun. 3, 1993

[30] Foreign Application Priority Data

Jun. 17, 1992 [JP] Japan .............................. 4-047883[U]
Jun. 17, 1992 [JP] Japan .................................. 4-181571
Nov. 20, 1992 [JP] Japan .............................. 4-085879[U]
Nov. 20, 1992 [JP] Japan .................................. 4-333799

[51] Int. Cl.$^6$ ......................... B23C 5/28; B23B 35/00
[52] U.S. Cl. ...................................... 409/132; 279/20; 407/11; 407/53; 408/1 R; 408/57; 408/226; 408/230; 409/136
[58] Field of Search ............... 409/135, 136, 131, 132, 409/138, 143; 408/1 R, 56, 57, 60, 61, 226, 230; 279/20; 407/11, 53, 54

[56] References Cited

U.S. PATENT DOCUMENTS

| 259,727 | 6/1882 | Smith ............................ 409/143 |
| 2,653,517 | 9/1953 | Pigott . |
| 3,313,186 | 4/1967 | Rochon ............................ 408/57 |
| 3,460,410 | 8/1969 | Briles . |
| 3,597,103 | 8/1971 | Birk . |
| 3,947,143 | 3/1976 | Gulla ............................ 408/226 |
| 4,570,952 | 2/1986 | Heimbeigner et al. ............... 408/61 |
| 4,784,540 | 11/1988 | Underhaug ........................ 409/138 |
| 5,085,540 | 2/1992 | Pagliaccio . |
| 5,148,728 | 9/1992 | Mazurkiewcz . |

FOREIGN PATENT DOCUMENTS

| 0123387 | 2/1984 | European Pat. Off. . |
| 0369154 | 10/1989 | European Pat. Off. . |
| 3617540 | 11/1987 | Germany ............................ 408/56 |
| 3801745 | 8/1989 | Germany . |
| 4019428 | 6/1990 | Germany . |
| 9203760 | 5/1992 | Germany . |
| 118407 | 6/1985 | Japan ............................ 408/56 |
| 1-132327 | 8/1989 | Japan . |
| 212008 | 8/1990 | Japan ............................ 408/56 |
| 98738 | 4/1991 | Japan ............................ 409/137 |
| 4-2743 | 1/1992 | Japan . |
| 4-25309 | 1/1992 | Japan . |
| 4-73440 | 6/1992 | Japan . |
| 2212078 | 7/1989 | United Kingdom ................... 407/11 |
| 9011159 | 3/1990 | WIPO . |
| 9014913 | 4/1990 | WIPO . |
| 9206817 | 4/1992 | WIPO . |

OTHER PUBLICATIONS

Patent Abstracts of Japan, vol. 13, No. 477, 28 Oct. 1989 and JP A1-188211 Mitsubishi Heavy Ind. Ltd.—27 Jul. 1989.

Translation of the American Society of Mechanical Engineer—Series B, vol. 1, Feb. 89, pp. 22–26—G. W. Vickers et al—"Ball-Mills Versus End-Mills For Curved Surface Machining", pp. 24–25, para. 2.3; FIG. 7.

Patent Abstracts of Japan, vol. 16, No. 187, 7 May 1992 and JP-A-40 25 309 Genichi Sato—29 Jan. 1992.

*Primary Examiner*—Daniel W. Howell
*Attorney, Agent, or Firm*—McAulay Fisher Nissen Goldberg & Kiel

[57] ABSTRACT

An apparatus machines a workpiece by a rotating cutting tool having at least one coolant channel extended toward the free end thereof with high-pressure coolant jetting onto the free end of the cutting tool. The coolant has sufficient pressure and flow rate to remove the heat and the chips generated during the machining. The cutting tool is fed in a path suitable for each machining operation with the cutting edges being advanced into the workpiece in a reverse direction to the feed direction. The apparatus can machine a workpiece of a material having high hardness and high toughness.

18 Claims, 12 Drawing Sheets

Fig. 2-a
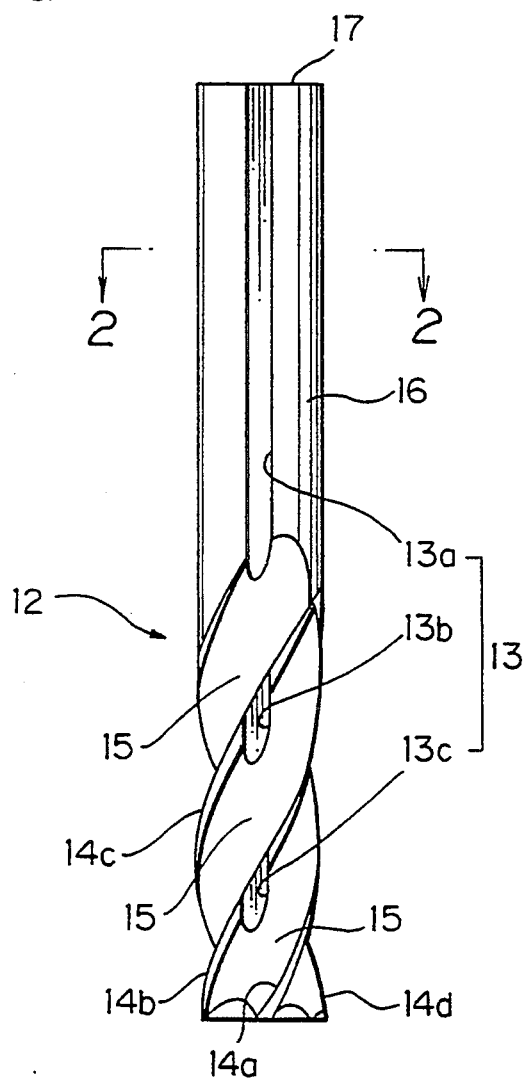
Fig. 2-b
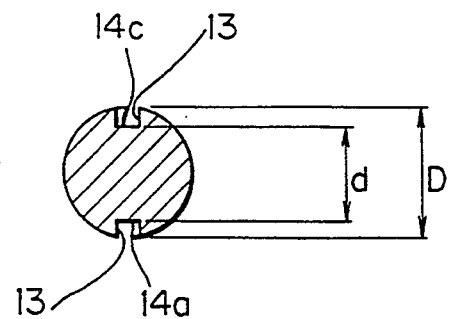

Fig. 3-a
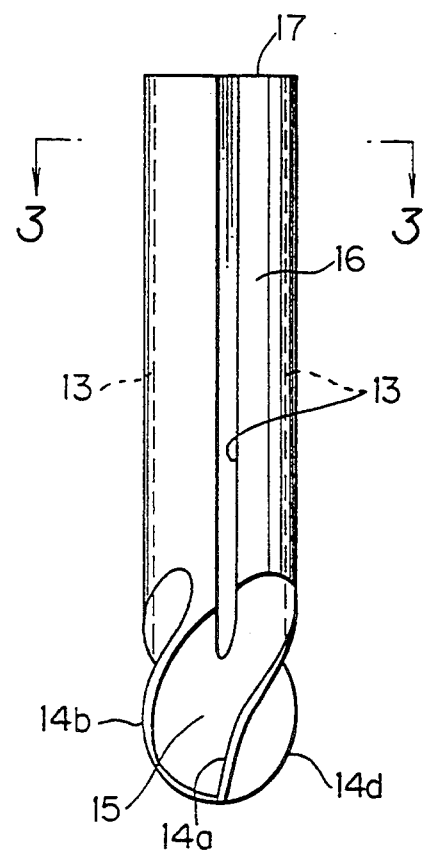
Fig. 3-b
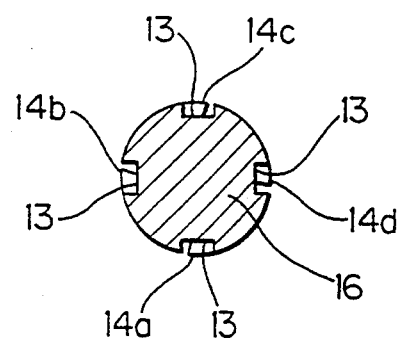

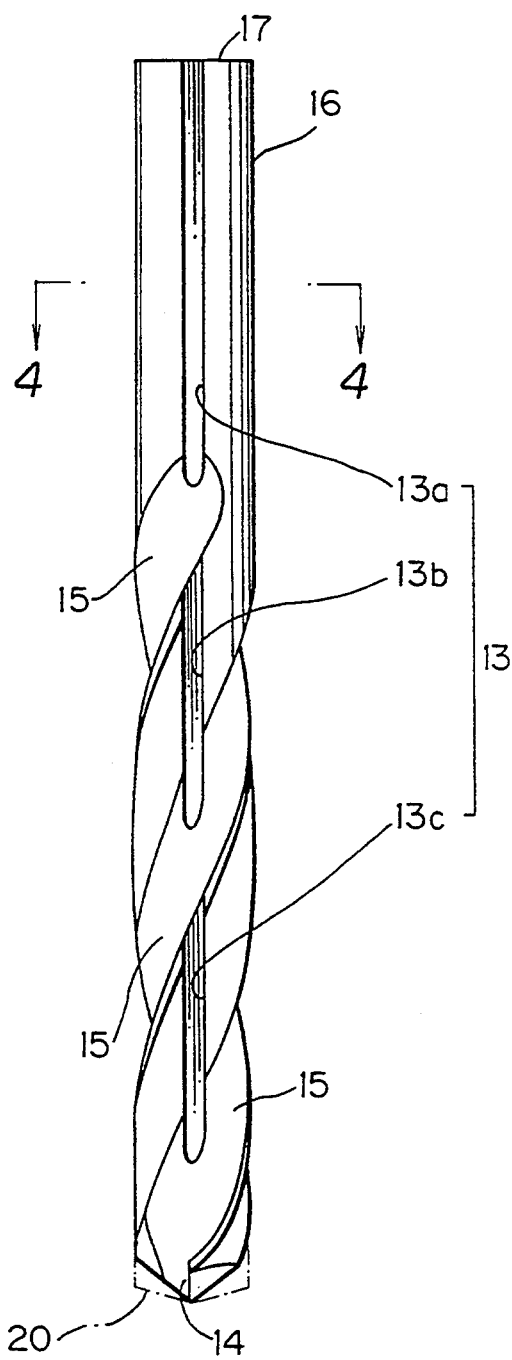
Fig. 4-a
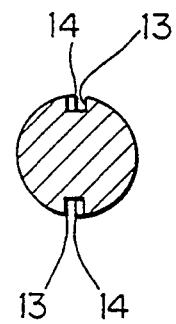
Fig. 4-b

Fig. 5-a
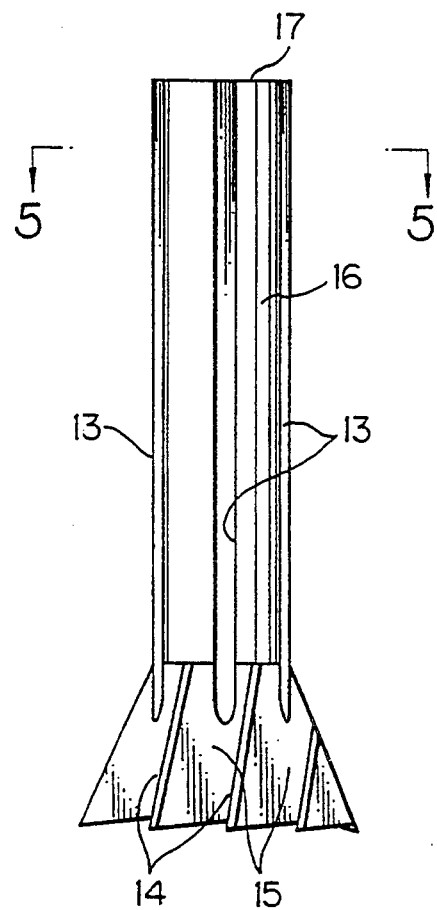
Fig. 5-b

Fig. 7-a
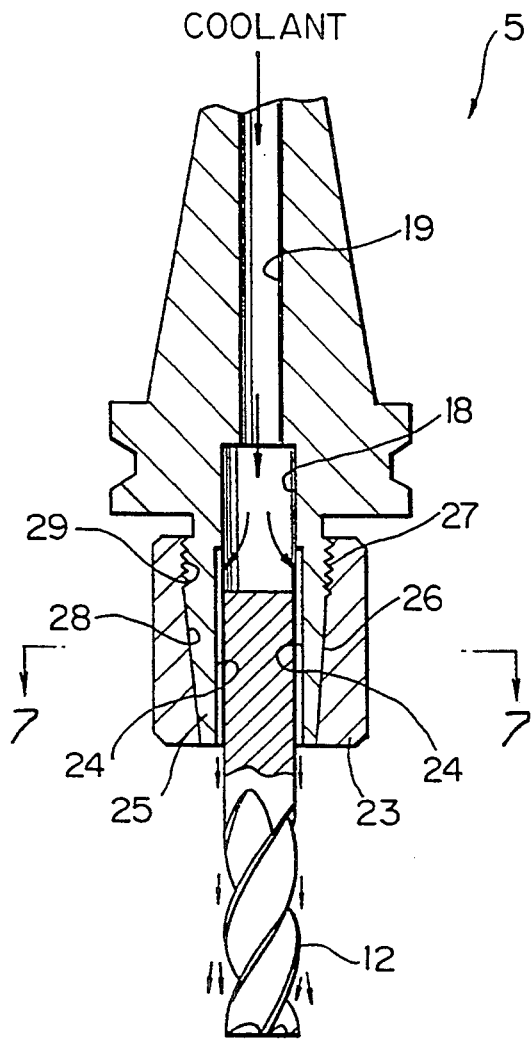
Fig. 7-b
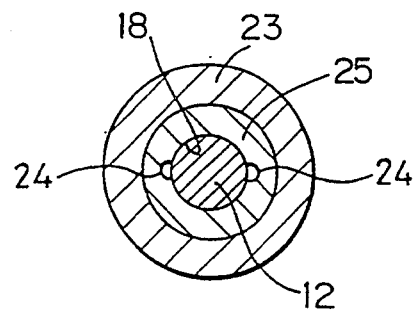

Fig. 8-a
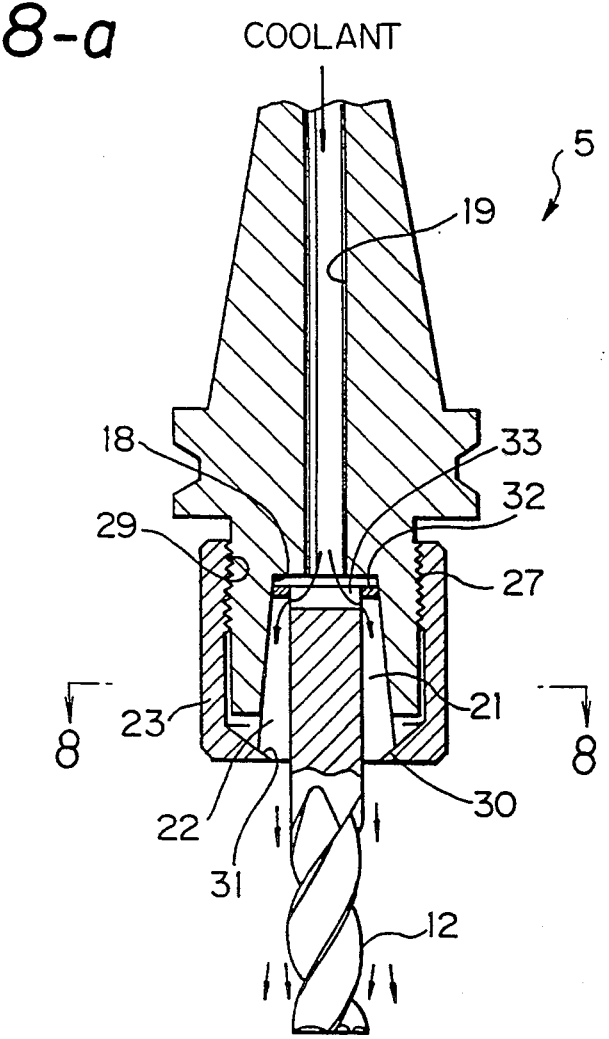
Fig. 8-b
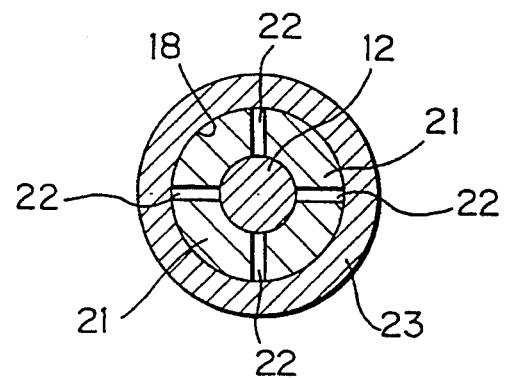

Fig. 11-a
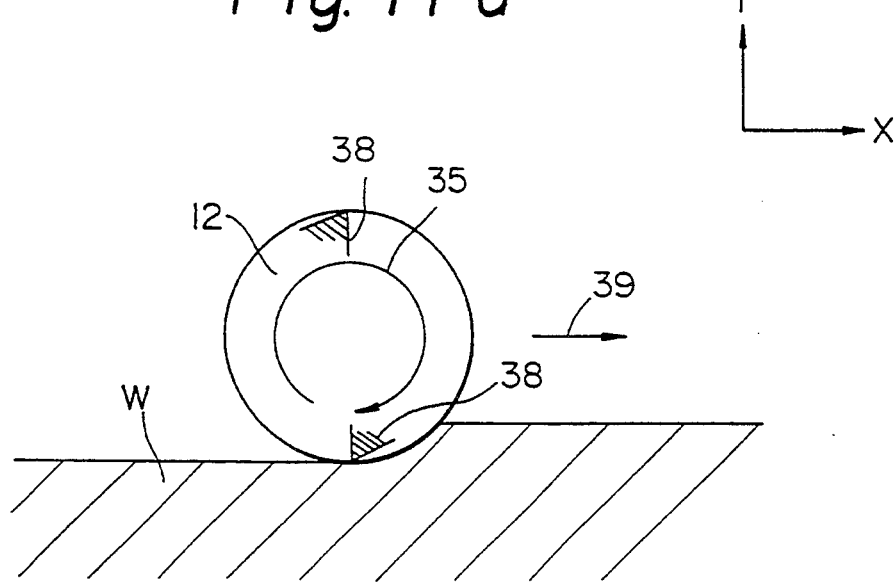
Fig. 11-b
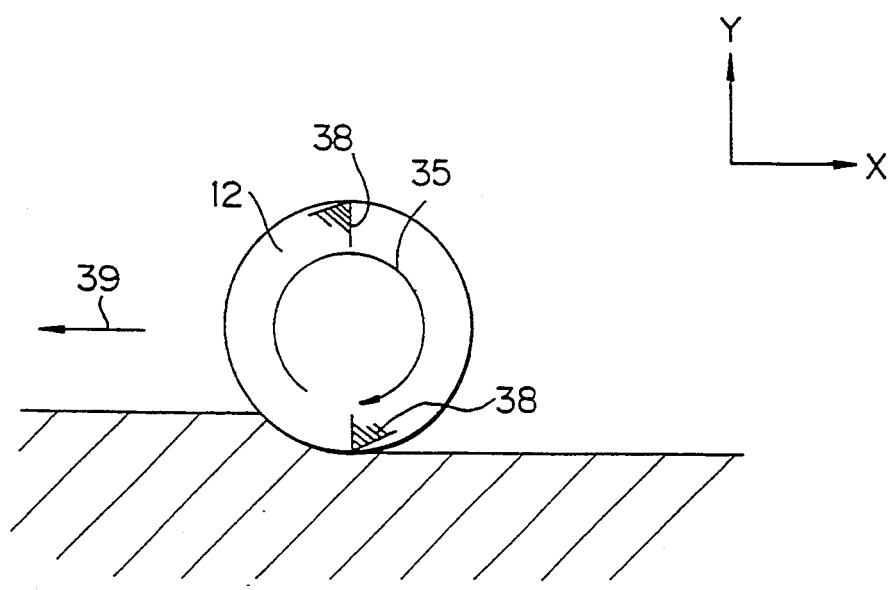

METHOD AND APPARATUS FOR MACHINING A WORKPIECE

BACKGROUND OF THE INVENTION (1) Field of the Invention

The invention relates to a method of, and an apparatus for, machining a workpiece with an end mill, a ball-end mill, a drill, a milling cutter, or another rotating cutting tool.

It is noted that "coolant" means, in this specification, fluid having the effect of removing heat and chips generated during the cutting work, such as cutting liquid or compressed air.

Furthermore, in this specification, the cutting tool has a shank and a cutting part connected thereto. The free end of cutting part forms a main cutting part which substantially performs a cutting action. And a secondary cutting part is defined as the remaining portion of the cutting part other than the main cutting part. The heat and chips are generated at a cutting point which is a portion of the workpiece being cut by the main cutting part of the cutting tool.

(2) Description of the Related Art

A cutting tool generally has higher hardness and rigidness than the workpiece to be machined. In cutting work, a rotating cutting tool is applied to the workpiece with a main cutting part thereof being forced onto a workpiece to be machined, whereby the cutting edge is advanced into the workpiece and chips are generated by the shearing action between the cutting edge and the workpiece. The rotating cutting tool is fed along a tool travel path relative to the workpiece so that the workpiece is machined into the desired shape. At this time, heat is generated because of the shearing work and the friction between the chips and the cutting tool. The heat generated during the cutting work will be transferred to the main cutting part of the cutting tool and reduce the tool life thereof. Furthermore, the heat will make a so-called built-up edge which increases the roughness of the machined surface.

These problems also become remarkable in the case of machining a workpiece of a material having low machinability, that is, a material of high hardness and/or high toughness, for example, titanium, Alloy 600 or hardened steel. These materials are not machinable by the prior art except by grinding or electrical discharge machining.

Thus, to avoid these problems, firstly, it is necessary to apply high-pressure (dynamic pressure) coolant to the shearing portion of the workpiece where the heat and the chips are generated, and to the friction portion between the chips and the face of the cutting tool to remove the heat and the chips generated during the cutting work. In other words, it is necessary to apply high-pressure coolant having sufficient pressure and flow rate to the main cutting part and the cutting point to remove the heat and the chips.

There are two known method to supply the coolant to the cutting edge. One is the so-called "through spindle coolant method". In this method, coolant is fed from a coolant supply source to a rear end of a spindle and passes through passages formed on the spindle, a tool holder and a cutting tool in sequence. The coolant finally jets out from the free end of the cutting tool. Another method is the so-called "through tool coolant method". In this method, coolant is fed from a coolant supply source to a tool holder, other than to the rear end of the spindle, by a rotary joint provided on the tool holder and passes through the passages formed on the tool holder and the cutting tool attached to the tool holder in sequence and finally jets out from the free end of the cutting tool.

On the other hand, there are known rotating cutting tools, such as end mills, ball-end mills or drills which have a through passages formed in the cutting tools from a rear end face to a free end thereof along an axis of the cutting tools.

The first prior art is a method of, and an apparatus for, cutting work with a rotating cutting tool having a through passage or passages and being held on a tool holder. The through spindle coolant method or the through tool coolant method is employed.

The second prior art is disclosed in the Unexamined Japanese Utility Model Publication No. 1-132327, in which a tap to form holes for separating a molding has a through passage for cutting oil formed in the tap along its axis and channels for cutting oil extended on an outer surface of a shank of the tap in a direction parallel to the axis. In the case of tapping a blind hole, coolant fed through the passage and the channels will effect lubrication, cooling, and removal of the chips. On the other hand, in the case of the through hole, the coolant fed via the channels only effects lubrication, cooling, and removal of the chips, but the coolant fed through the passage will flow out from the workpiece without any effects.

The third prior art is disclosed in the Examined Japanese Utility Model Publication No. 4-2743, in which an end mill has at least one oil channel on an outer surface thereof. The channel is extended in a direction parallel to an axis of the end mill from a rear end to a chip removal flute thereof. Coolant, such as compressed air or cutting oil jets out through the oil channel, whereby the chips are removed smoothly. Furthermore, the end mill can be reground since there are no passages at its free end.

The fourth prior art is a method, and an apparatus disclosed in the Unexamined Japanese Patent Publication No. 4-25309, in which cutting edges with an ultrafine grain are used and high-pressure water having a pressure of at least 10 kg/cm$^2$ jets out from coolant discharge nozzles toward the cutting point. The nozzles are arranged separately from the cutting tool. The high-pressure water jet cools the cutting point immediately. The workpiece and the cutting tool are not damaged by heat since there is substantially no heat transfer to the cutting tool.

The fifth prior art is disclosed in the Unexamined Japanese Utility Model Publication No. 4-3440, in which coolant is supplied through coolant passages formed in a member rotating with a cutting tool. Discharge nozzles in the passages have adjustable jet angles so that the coolant can be applied to cutting edges of a cutting tool. The coolant is sufficiently applied to the cutting edges without being obstructed by the cutting tool since the coolant discharge nozzles rotate with the cutting tool. Furthermore, the relative position between the discharge nozzles and the cutting tool does not change when the cutting tool is fed in any direction along the X-, Y- and Z-axes, whereby the coolant is always sufficiently applied to the predetermined point.

The first prior art, mentioned above, is directed onto supply the coolant as possible as near the cutting point. To that end, through passages for the coolant are formed in the cutting tool. In the case of the cutting tool of carbide, however, it is difficult to form the passages. Also, in the case of the cutting tool having cutting edges near the center portion of the free end of the cutting tool, such as a ball-end mill or a drill, it is more difficult to form the passage. Because the passage must be made to bend or fork so that the exit passage is formed in the flank in order that it does not interfere with the action of the central portion of the free end of the cutting tool. Furthermore, in the case of a cutting tool having a small diameter, the through passage reduces the rigidity of the cutting tool. This results in the cutting tool tending to chip. Also, there is a problem in that insufficient coolant is supplied because of the small sectional area of the passage.

The second prior art discloses a tap as a tool cutting a thread used at relatively low cutting speed. Therefore, the coolant is preferably supplied to the cutting point at low pressure and the flow rate adjusted to the rotation of the tap so that the coolant flows into the threaded portion at very low rate. On the other hand, a cutting tool such as an end mill, a milling cutter or a drill is used at relatively high cutting speed in which the coolant must be supplied at high pressure and high flow rate. Therefore, the second prior art can not be applied to cutting work with such cutting tools.

In the third prior art, there is a problem that the coolant supplied at high pressure and flow rate will be interrupted by the cutting edges nearest to the shank since the coolant channels are extended only to the chip removal flute nearest the shank. Therefore, insufficient coolant will be applied to the main cutting part. In the case that the cutting tool is used at only its main cutting part, for example in the case of standard grooving work, an end mill is used at only its free end portion and the above problem becomes insurmountable. The insufficient cooling does not remove the chips quickly at the cutting point.

In the fourth prior art, the direction of the discharge nozzles of the coolant passages must be adjusted depending on the diameter and the length of the cutting tool used, so that the coolant is directed onto the cutting point since the direction of the nozzles are not arranged parallel to the axis of the cutting tool. Furthermore, there is another problem that the workpiece may interrupt the coolant applied to the cutting point directly depending on the shape of the workpiece.

In the fifth prior art, the exit of the coolant passage in the rotating member must face the outer surface of the cutting tool. Therefore, the jet angle of the exit of the coolant passages must be varied depending on the diameter and the length of the cutting tool used.

On the other hand, in practice, an end mill or a ball-end mill is not provided with cutting edges at the center of the free end thereof. Therefore, a single end mill or a single ball-end mill can not machine a pocket in a solid material by itself since large amount of heat is generated at the center region and the cutting tool is damaged by the heat. For example, in the prior art, when a die is machined from a solid material, firstly the solid material is bored by a drill then the prepared hole is made bigger by an end mill or a ball-end mill so that the workpiece is machined into the desired shape.

Thus, in this case, two types of cutting tools, that is, a drill and an end mill or a ball-end mill must be used and which must be changed during the machining process. Furthermore, it is necessary to provide two NC programs for the respective cutting tools. These problems lead to reduced efficiency and increased time and cost for the machining. There is, however, no successful method established to machine a pocket from a solid material by a single end mill or a single ball-end mill which is used for the rough cutting through the finishing.

SUMMARY OF THE INVENTION

One object of the invention is to provide a method of and an apparatus for machining a workpiece by cutting with a rotating cutting tool, such as an end mill, a ball-end mill, a drill or a milling cutter, in which high-pressure coolant having sufficient pressure and flow rate is directed in the form of a jet toward the main cutting part thereof, whereby the removal of heat and chips generated during cutting work is improved. The high-pressure coolant can be applied to the main cutting part at any time during the machining without adjustment even when the cutting tool is changed.

Another object of the invention is to provide a method of and an apparatus for machining a workpiece by cutting which can efficiently machine a workpiece material having low machinability, that is, a material of high hardness and/or high toughness, for example titanium, Alloy 600 or hardened steel. These materials are not machined by the prior art except by grinding or electrical discharge machining.

Another object of the invention is to provide a novel method of cutting to machine a three dimensional shape, such as a pocket or a bore, with low surface roughness in a solid workpiece by a single end mill or a single ball-end mill which is used for rough cutting through finishing.

Another object of the invention is to provide a cutting tool suitable for the above mentioned novel method and apparatus.

To achieve the above objects, in accordance with the invention, there is provided a method of machining a workpiece by a rotating cutting tool including a shank adapted to be inserted into a tool fitting bore of a tool holder, and a cutting part integrally formed therewith and having cutting edges terminated at a free end of the cutting tool, which method comprises the steps of:

supplying coolant into the tool fitting bore of the tool holder, the coolant having sufficient pressure and flow rate to remove heat and chips generated during the machining;

directing the coolant in the form of a jet from a rear end of the shank to substantially the free end of the cutting tool in a direction parallel to an axis of the cutting tool; and feeding the cutting tool relative to the workpiece in at least one direction corresponding to one of a plurality of feed axes.

In accordance with the characteristics of the present invention, the coolant is directed onto the free end of the cutting tool through at least one coolant channel provided on an outer surface of the cutting tool and extended from the shank to a region adjacent to the free end.

In accordance with the advantages of the present invention, the coolant is directed onto the free end of the cutting tool through at least one coolant channel provided in the tool holder and extended in a direction parallel to the axis of the cutting tool.

In accordance with the characteristics of the present invention, the cutting tool is fed relative to the workpiece in a direction parallel to the axis of the cutting tool, and at the same time fed along a tool path in a plane perpendicular to the axis of the cutting tool.

In accordance with the characteristics of the present invention, the cutting tool is fed relative to the workpiece around a contour of the workpiece in a plane perpendicular to an axis of the cutting tool.

In accordance with the advantages of the present invention, the cutting tool is fed relative to the workpiece in a direction parallel to the axis of the cutting tool, and at the same time fed in a spiral path so that the workpiece is bored by down cutting, in the down cutting, the cutting edges are advanced into the workpiece in a reverse direction to a feed direction of the cutting tool.

In accordance with the characteristics of the present invention, a ball-end mill is selected as the cutting tool, and depth of cut does not exceed one tenth of the diameter of the ball-end mill.

In accordance with the characteristics of the present invention, a ball-end mill is selected as the cutting tool, and pick feed of the relative motion between the ball-end mill and the workpiece does not exceed a half of the diameter of the ball-end mill.

In accordance with the advantages of the present invention, the workpiece is composed of a material having high hardness and/or high toughness.

In accordance with the advantages of the present invention, the method further comprising a step of:
  programming a NC program for controlling the machining, the NC program comprising a plurality of subsidiary programs for respective standard machinings, the standard machinings including at least boring work, pocket machining work and grooving work.

In accordance with the invention, there is provided an apparatus for machining a workpiece by a rotating cutting tool including a shank adapted to be inserted into a tool fitting bore of a tool holder, and a cutting part integrally formed therewith and having cutting edges terminated at a free end of the cutting tool, which apparatus comprises:
  means for supplying coolant into the tool fitting bore of said tool holder, the coolant having sufficient pressure and flow rate to remove heat and chips generated during the machining;
  means for directing the coolant in the form of a jet from an rear end of the shank to substantially the free end of the cutting tool in a direction parallel to an axis of the cutting tool;
  means for feeding the cutting tool relative to the workpiece in at least one direction of corresponding to one of a plurality of feed axes.

In accordance with the characteristics of the present invention, the coolant supplying means comprises:
  a coolant supply source for pressurizing the coolant to a predetermined pressure;
  a first coolant passage means provided in a spindle for rotating the cutting tool about the axis thereof and communicated to the coolant supply source means; and
  a second coolant passage means provided in the tool holder and communicated to the first coolant passage means and the tool fitting bore.

In accordance with the preferred embodiments of the present invention, the coolant directing means comprises at least one coolant channel means provided on an outer surface of the cutting tool and extended from the shank to a region adjacent to the free end of the cutting tool.

In accordance with the other embodiments of the present invention, the coolant directing means comprises at least one coolant channel means provided on the inner surface of the tool fitting bore of the tool holder or on a collet and extended in a direction parallel to the axis of the cutting tool, the collet receiving the shank of the cutting tool and being inserted into the tool fitting bore of the tool holder with the cutting tool so as to chuck the cutting tool on the tool holder.

In accordance with the invention, there is provided a cutting tool for machining a workpiece by cutting comprising:
  a shank adapted to be inserted into a tool fitting bore of a tool holder;
  a cutting part integrally formed with the shank and having cutting edges terminated at a free end of the cutting tool, the cutting edges substantially performs cutting action at the free end; and
  at least one coolant channel on an outer surface of the cutting tool extended toward the free end from a rear end of the shank in a direction parallel to an axis of the cutting tool.

In accordance with the characteristics of the present invention, the cutting tool is a ball-end mill and the coolant channel is provided corresponding to a number of the cutting edges of the ball-end mill.

In accordance with the characteristics of the present invention, the cutting tool is an end mill or a drill and the coolant channel is extended to the cutting edges of the cutting tool arranged between the shank and the free end of the end mill.

In accordance with the characteristics of the present invention, the cutting tool is a milling cutter.

High-pressure coolant is fed to the coolant supply passage in the tool holder by the through spindle coolant method or the through tool coolant method and, in turn, directed in the form of a jet toward the free end of the cutting tool through the coolant channel of the cutting tool or the along the outer surface of the cutting tool. At this time, the coolant is directed so as to be applied to the free end since the coolant supply passage is parallel to the axis of the cutting tool and formed so that its opening face to the cutting point of the free end.

The jetted coolant has a sufficient pressure and flow rate not to flow out by centrifugal force. Therefore, the coolant is applied to the free end so that the heat and chips generated at the cutting point are removed quickly and surely.

The coolant is also applied to the free end of the cutting tool without interruption by the workpiece since the coolant is directed onto the free end of through the coolant channels extended parallel to the axis of the cutting tool.

Furthermore, it is not necessary to change the jet angle of the coolant depending on the diameter or length of the cutting tool to be used.

The features and advantages of the present invention will become more apparent when viewed in the light of the description of the best embodiment of the invention and drawings which follow, which together form a part of the specification.

BRIEF DESCRIPTION OF THE DRAWINGS

FIG. 2-a shows as an example an elevation of an end mill used in the present invention.

FIG. 2-b is a section along the line 2—2 in FIG. 2-a.

FIGS. 3-a shows as an example an elevation of a ball-end mill used in the present invention.

FIG. 3-b is a section along the line 3—3 in FIG. 3-a.

FIG. 4-a shows as an example an elevation of a drill used in the present invention.

FIG. 4-b is a section along the line 4—4 in FIG. 4-a.

FIG. 5-a shows as an example an elevation of a milling cutter used in the present invention.

FIG. 5-b is a section along the line 5—5 in FIG. 5-a.

FIG. 7-a shows an elevation partly in section of an apparatus for cutting work of another embodiment of the present invention.

FIG. 7-b is a section along the line 7—7 in FIG. 7-a.

FIG. 8-a shows an elevation partly in section of an apparatus in accordance with the third embodiment of the present invention.

FIG. 8-b is a section along the line 8—8 in FIG. 8-a.

FIG. 11-a explains cutting work by down-cut machining.

FIG. 11-b explains cutting work by up-cut machining.

DESCRIPTION OF THE PREFERRED EMBODIMENTS

Figure 1:
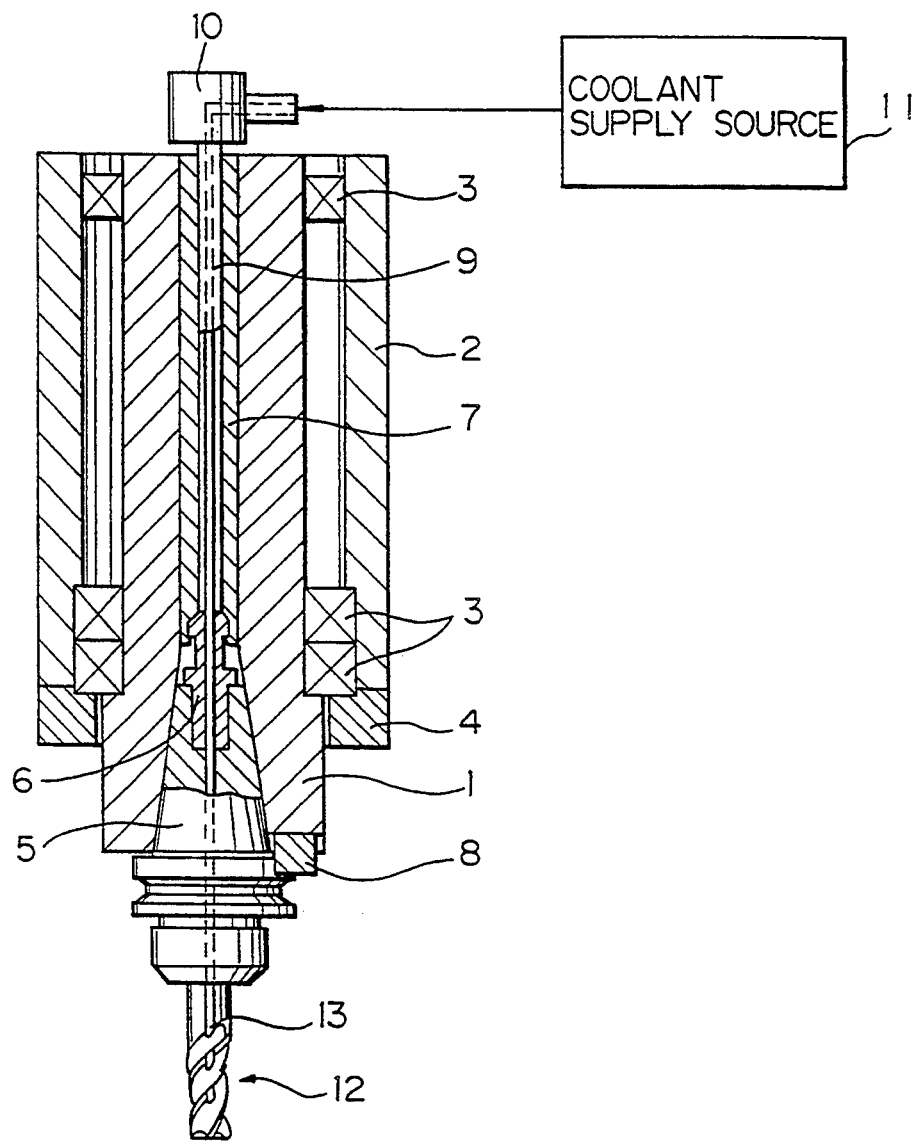
FIG. 1 is an elevation partly in section of an apparatus of the present invention for cutting work.

In FIG. 1, there is shown an apparatus for cutting work in accordance with a first embodiment of the present invention. The apparatus includes a spindle 1 which is rotationally mounted in a housing 2 by means of bearings 3. The housing 2 is closed at the lower end by an end plate 4. The spindle 1 is rotated by means of an appropriate drive means (not shown).

A tool holder 5 is mounted into a tapered hole on the lower end of the spindle 1 with a pull stud 6 of the tool holder 5 being lifted upwardly into the tapered hole by means of a draw bar 7. The draw bar 7 is extended along an axis of the spindle 1. The tool holder 5 is positioned in a rotating angular position relative to the spindle 1 by a positioning key 8.

It is noted that a Z-axis, in this specification, is defined along the axis of the spindle 1. An X-axis is defined along an axis which is perpendicular to the Z-axis. And a Y-axis is defined along an axis which is perpendicular to both the Z- and X-axes.

A first coolant passage 9 is extended along the Z-axis, that is, the axis of the spindle 1 in the draw bar 7. A second coolant passage 19 is provided in the tool holder 5 and extended through the pull stud 6 along the Z-axis. The first coolant passage 9 abuts and is communicated to the second coolant passage 19 (FIG. 6) when the tool holder 5 is mounted in the spindle 1. The first coolant passage 9 may comprise a pipe inserted into a bore extended through the draw bar 7.

The first and second coolant passages 9 and 19 rotate together with the spindle 1. A rotary joint 10 is provided at the rear end of the first passage 9, through which coolant is supplied to the first coolant passage 9 from a coolant supply source 11. The coolant supply source 11 may comprise a coolant pump and a coolant reservoir (not shown).

A cutting tool 12 (an end mill 12 is shown in FIG. 1 as an example) is detachably mounted in the fitting bore 18 (referred also FIG. 6) of the tool holder 5 by the usual method. The end mill 12 is fed along the X-, Y- and Z-axes relative to a workpiece positioned below the end mill 12 (not shown in FIG. 1) so that the workpiece is machined into the desired shape.

The end mill 12 has at least one coolant channel 13 on the outer surface thereof. The coolant channel 13 is extended from the rear end 17 of a shank 16 (FIG. 2) to a portion adjacent to the main cutting part of the end mill 12 along the axis thereof. The coolant from the coolant supply source 11 is fed to the apparatus through the rotary joint 10 and, in turn, passes through the first and second coolant passages 9, 19, tool fitting bore 18 of the tool holder 5 and the coolant channel 13 of the end mill 12. Thus, the coolant is directed in the form of a jet toward the main cutting part of the end mill 12 in the direction parallel to the axis of the end mill 12. The coolant is supplied during the cutting work.

In FIG. 2, there is shown an end mill 12 used in the present invention. The end mill 12 of FIG. 2 is a type having four cutting edges, that is, the end mill 12 has four twisted cutting edges 14a, 14b, 14c and 14d, and four chip removal flutes 15.

The end mill 12 is provided with at least one coolant channel 13, in FIG. 2 there are shown two coolant channels 13 as an example. The coolant channels 13 are extended on the outer surface of the end mill 12 from the rear end 17 to the the main cutting part thereof, and are parallel to the axis of the end mill 12.

The distance, which is indicated by d in FIG. 2-b, between the bottoms of the opposite channels 13 is smaller than the diameter D of the end mill 12 at the cutting part. In other words, the coolant channels 13 are also extended to the cutting edges 14a, 14c so that the coolant channels 13 lead the coolant to the main cutting part without the interruption of the cutting edges 14a, 14c. The coolant channels 13, thus, may be formed deeper than that shown in FIG. 2 when the diameter D of the end mill 12 at the cutting part is larger than that of the shank 16. Each of the coolant channels 13 can be regarded as one channel though it comprises three parts, that is, a first part 13a on the shank 16, a second part 13b on the cutting edge 14c and a third part 13c on the cutting edge 14b, which are aligned one another. The sectional shape of the coolant channels 13 can be formed in the various shapes other than the rectangle as FIG. 2, for example, a semicircle or circle.

It is noted that sharp edges of the cutting part, for example the edge between the coolant channel 13b and the cutting edge 14c or the edge between the coolant channel 13c and the cutting edge 14b, may be chamfered so as to prevent the part from being chipped out.

In FIG. 3, there is shown a ball-end mill 12 which is a type having four cutting edges 14a, 14b, 14c and 14d. The ball-end mill has four coolant channels 13 as shown in FIG. 3 as an example. Each of the coolant channels 13 is positioned at 90 degrees in a circumferential direction respectively as shown in FIG. 3-b. Each of the coolant channels 13 is also extended on a shank 16 in a direction parallel to the axis of the ball-end mill from the rear end 17 the shank toward the faces of the cutting edges 14a, 14b, 14c and 14d respectively.

In this ball-end mill 12, the high-pressure coolant passes through the coolant channels 13 and is directed in the form of a jet toward the main cutting part, as explained referring to FIG. 2. And the high-pressure coolant removes the heat generated at the cutting point and collides to fly away the chips which have a tendency to adhere to the cutting edges.

Referring to FIG. 4, there is shown a drill 12 in accordance with the present invention having two coolant channels 13 as an example. The two coolant channels are positioned on the opposite sides of the diameter respectively, and are extended from the rear end 17 toward the main cutting part in a direction parallel to the axis of the drill 12. The each coolant channel 13 comprises three portions 13a, 13b and 13c aligned one another.

In FIG. 4, the locus of the main cutting part is shown in the dashed line 20 when the drill rotates about its axis.

Referring to FIG. 5, there is shown a milling cutter 12 for the dovetail grooving work as an example. The milling cutter has five coolant channels 13 as an example. Each coolant channel 13 is extended from the rear end 17 toward the respective face of the cutting edge 15, and is parallel to the axis of the milling cutter 12. The coolant is applied to the main cutting part through the coolant channels 13.

Figure 6:
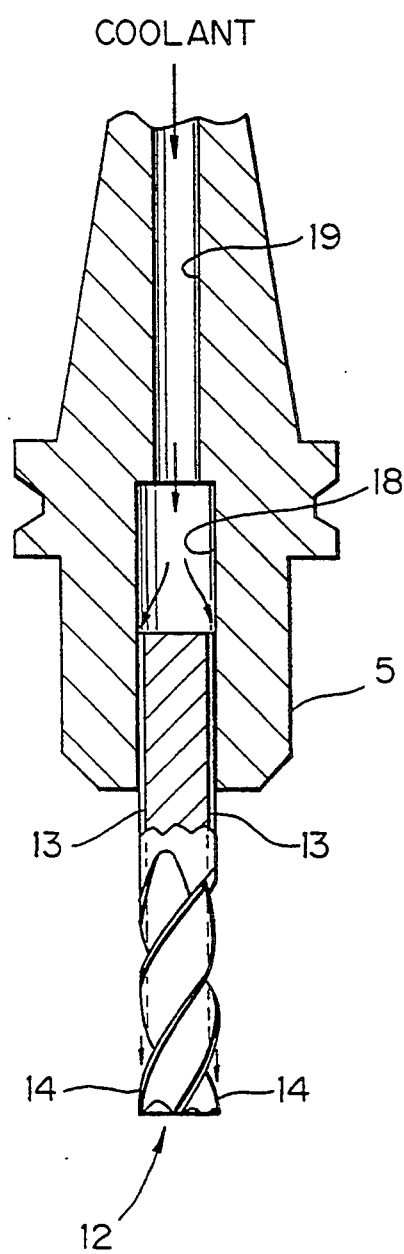
FIG. 6 shows a second coolant passage in a tool holder, and coolant channels on outer surface of a cutting tool, through which coolant passes toward a main cutting part a cutting tool used in the present invention.

Now referring to FIG. 6, there is shown the end mill 12 mounted on a tool holder 5. The shank 16 of the end mill 12 is fitted into a tool fitting bore 18 of the tool holder 5. The tool fitting bore 18 is communicated to the second coolant passage. The coolant is fed into the tool fitting bore 18 through the first and second coolant passage 9 and 19, in turn, the coolant is directed outwardly to the main cutting part of the end mill 12 through the coolant channel 13 of the end mill 12 as shown. The coolant in the tool fitting bore 18 rotates together with the spindle 1, the tool holder 5 and the end mill 12 during the cutting work. The coolant jets at a high pressure, for example at 70 kg/cm$^2$ so that the coolant from the coolant channels 13 can reach to the main cutting part with sufficient pressure even when the spindle 1 rotates at high speed.

The sectional area of the coolant channels 13 can be made much larger than that of a coolant passage provided in the end mill 12 along the axis thereof in the first prior art. Therefore, the coolant channels 13 allow a much higher coolant flow rate as compared with the coolant passage made in the end mill extended along the axis thereof. Thus, the coolant is applied to the main cutting part with sufficient pressure and flow rate to remove the heat and chips quickly. In the case of deep grooving work, in which the entire length of the cutting part of the end mill is used, the coolant will be applied to the entire length of the cutting part through the opening between the coolant channels 13a and 13b, 13b and 13c so that, even in such the case described above, the removal of the heat and chips is carried out surely.

Referring to FIGS. 7 and 8, there are shown the second and the third embodiments respectively, in which standard rotating cutting tools such as end mills, ball-end mills, drills or milling cutters have no coolant channels. The cutting tool 12, in these embodiments is an end mill 12, is mounted in a tool holder 5 in the usual ways, that is, by a tapered chuck in FIG. 7, and by a collet chuck in FIG. 8. The coolant is directed onto the free end of the cutting tool 12 in the form of a jet through coolant channels 24 provided in the tool fitting bore 18 of the tool holder 5 in the both embodiments.

In FIG. 7, for example, the end mill 12 is inserted and mounted into the fitting bore 18 of the tool holder 5. The tool holder 5 is provided with a tool mounting 25 having a tapered outer surface 26 and a threaded portion 27. A chuck ring 23 has a tapered inner surface 28 corresponding to the tapered outer surface 26 of the tool mounting 25, and a threaded portion 29 corresponding to the threaded portion 27 of the tool mounting 25. When the chuck ring 23 is fastened to the tool mounting 25 by the threaded portions 27 and 29, the tapered surfaces 26 and 28 engage each other, whereby the tool mounting 25 chucks the end mill 12 inserted into the fitting bore 18.

The tool fitting bore 18 is provided with two coolant channels 24 arranged diametrically opposite to each other as shown in FIG. 7-b. The coolant channels 24 are extended to the end of the tool holder 5 and are parallel to the axis of the spindle 1 (FIG. 1). Two third coolant passages are formed between the coolant channels 24 and the outer surface of the shank of the end mill 12, when the the end mill 12 is mounted in the tool holder 5.

The tool fitting bore 18 is also communicated to the first coolant passage 9 (FIG. 1) through the second coolant passage 19 provided in the tool holder 5. The coolant from the coolant supply source 11 (FIG. 1) is led to the tool fitting bore 18 through the first and second coolant passages 9 and 19. The coolant fed to the tool fitting bore 18 is directed through the third coolant passages 24 toward the main cutting part of the end mill 12 along the outer surface of the end mill 12.

In FIG. 8, the end mill 12 is mounted on the tool holder 5 by the collet chuck comprising a collet 21 and a collet ring 23. The end mill 12 is inserted with the collet 21 into the tool fitting bore 18 of the tool holder 5.

The collet 21 comprises an engagement surface 30 and four slots 22. The slots 22 are arranged equiangular to one another in the circumferential direction as seen in FIG. 8-b. The slots 22 are also extended to the end of the collet 21 and are parallel to the axis of the spindle 1 (FIG. 1). The collet 21 is divided into four segments by the four slots 22, however, each segments are connected to one another by a connecting ring portion 32.

The collet ring 23 has an engagement surface 31 corresponding to the engagement surface 30 of the collet 21, and a threaded portion 27 corresponding to the threaded portion 29 of the tool holder 5. When the collet ring 23 is fastened to the tool holder 5 by the threaded portions 27 and 29, the collet 21 is locked to the tool holder 5 and the engagement surfaces 30 and 31 engage each other, whereby the end mill 12 mounted on the tool holder 5.

The tool fitting bore 18 is communicated to the first coolant passage 9 (FIG. 1) through the second coolant passage 19. The coolant from the coolant supply source 11 (FIG. 1) is led to the tool fitting bore 18 through the first and second coolant passages 9 and 19. The four slots 22 are communicated to one another by a center opening 33 provided on the connecting ring portion 32. The center opening is communicated to the second coolant passage 19 through the tool fitting bore 18. Then the coolant is divided into the four slots 22 through the center opening 33 and jets toward the main cutting part of the end mill 12 along the outer surface thereof.

In the second prior art, as described above, there is a coolant discharge nozzle through which the coolant jets toward an end mill rotating at a high speed. The coolant discharge nozzle is, however, externally mounted from the end mill. The rotating end mill is surrounded by a layer of air rotating substantially at the same speed of the end mill. The air layer interrupts the jetted coolant to be applied to the face of the cutting edge of the end mill directly. In other words, the large portion of the jetted coolant is deflected by the air layer.

On the other hand, in the present invention, the coolant is applied to the cutting point from the coolant channels of the cutting tool or the coolant passages of the tool holder. The coolant channels or passages are rotating with the cutting tool. Therefore, the coolant to be applied is already in the rotating air layer, and the coolant can reach to the cutting point without being deflected be the air layer.

It is noted that compressed air can be used as the coolant other than the liquid such as cutting oil or water to cool the cutting point and to remove the chips.

Now, a description of the operation of the apparatus of the present invention achieving some particular machining operations of a workpiece will be provided herein below with reference to FIGS. 9 through 13.

As previously mentioned, an end mill or a ball-end mill is not provided with a cutting edge at the center of the free end thereof. Therefore, it is not possible to form a pocket or a recess in a solid material by a single end mill or a single ball-end mill itself, since considerable heat is generated and the cutting tool can be damaged by the heat. For example, in the prior art, to machine a die in a solid material, firstly the solid material is bored with a preparing hole by a drill and, in turn, the preparing hole is made bigger by an end mill so that the desired die shape is machined. Thus, in this case, two types of cutting tools, that is, a drill and an end mill must be used which are changed during the machining process. Furthermore, it is necessary to provide two NC programs for respective cutting tools. These problems lead the lower efficiency, much time consumption and higher cost. There is, however, no successful method established to machine a pocket or a recess in a solid material by a single end mill or a single ball-end mill which is used during the machining process from the rough cutting to the finishing.

The problem is solved by the present invention. In the present invention, a single end mill or a single ball-end mill is used. The end mill or the ball-end mill is fed along the Z-axis, and at the same time is fed relative to the workpiece along the X- and Y-axes. The high-pressure coolant is applied to the main cutting part as previously mentioned. This permits a single cutting tool to perform either the boring work or the pocket machining work without changing to another type of cutting tool during the machining process, whereby the machining efficiency will be increased.

Figure 9:
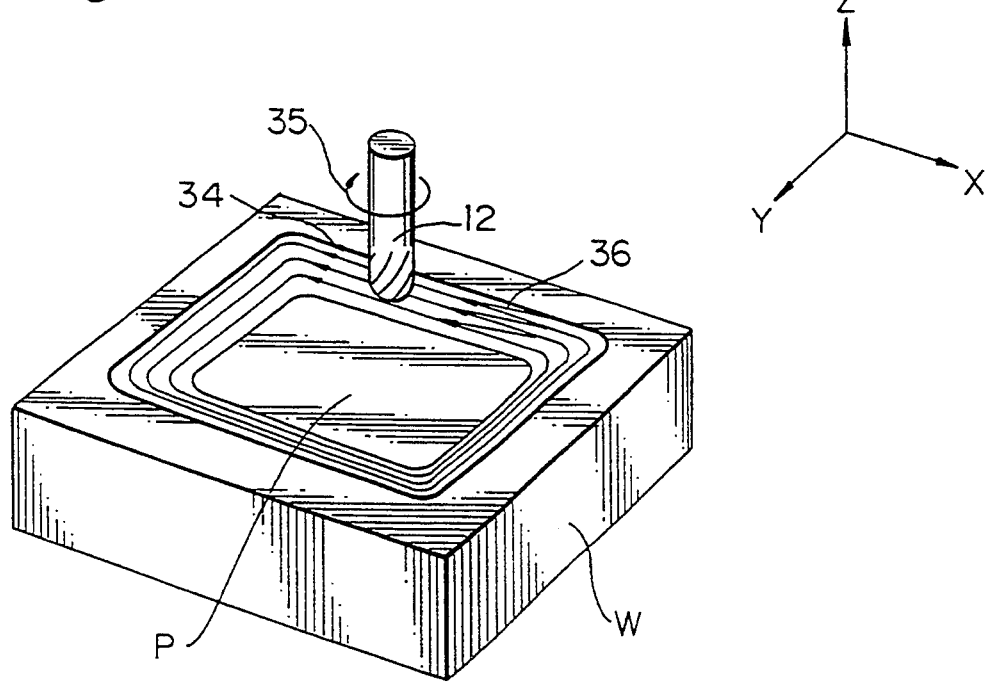
FIG. 9 explains a cutting method in which a cutting tool is fed in a spiral path around an inner contour of a workpiece.
Figure 10:
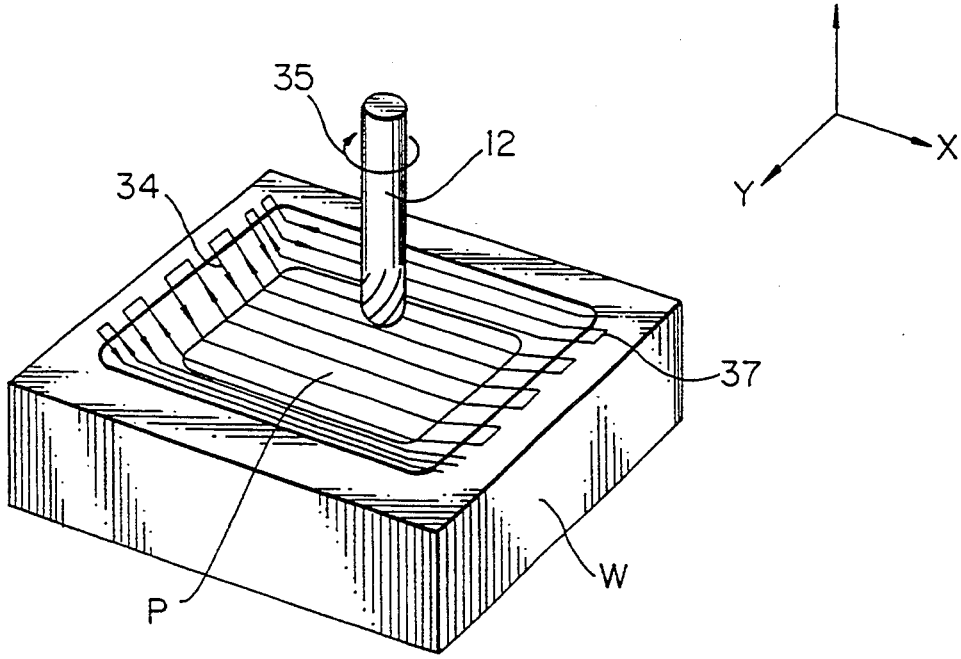
FIG. 10 explains a cutting method in which a cutting tool is fed in a back-and-forth path across a workpiece.

Referring to FIGS. 9 and 10, there are shown two types of pocket machining works respectively, that is, a contour following machining as shown in FIG. 9 and back-and-forth following machining as shown in FIG. 10. In the contour following machining, a cutting tool is fed around an inner contour of the workpiece. In the back-and-forth following machining, a cutting tool is fed in a back-and-forth manner across the workpiece. The direction of rotation 35 of the cutting tool is decided depending on the direction of the twist of the cutting part of the end mill 12, and is usually a clockwise direction.

In the case of the contour following machining, a cutting tool 12, such as an end mill or a ball-end mill, travels around an inner contour of the workpiece W in an X-Y plane at a position on the Z-axis. When the cutting tool 12 has traveled around the inner contour of the workpiece, the cutting tool 12 is fed by a predetermined depth of cut in the Z-axis direction, while being also fed in the x- and/or Y-axis direction. Therefore, in FIG. 9, the cutting tool is fed along a slope path 36. The cutting tool 12 then travels around the next inner contour and the process is repeated until the desired shape is obtained.

It is obvious that, when machining a land or a projection on a workpiece, the cutting tool 12 is fed around an outer contour of the workpiece, and when machining a pocket or a recess, the cutting tool 12 is fed around the inner contour of the workpiece W as shown in FIG. 9.

On the other hand, in the case of the back-and-forth path machining in FIG. 10, the cutting tool is fixed in the Y-axis and fed in the X-axis direction from one cutting end to the other cutting end of the workpiece with being fed in the Z-axis direction by appropriate depth of cut. The cutting tool 12 is fed by a predetermined pick feed 37 in the Y-axis direction when the cutting tool 12 has moved the predetermined path in the X-axis. Then the cutting tool 12 will be fed to the next travel path back in the X-axis direction by being fed in the Z-axis direction to appropriate depth of cut. The process will be repeated until the desired depth is obtained.

In comparison between the above described two machining methods, the contour following machining has advantages because of the following reasons. In the back-and-forth following machining, the machining load on the cutting tool 12 and the direction of the feed of the cutting tool 12 are changed greatly at the corners of the tool travel path. Therefore, the machining is unstable in the back-and-forth following machining. Furthermore, in the back-and-forth following machining, the cutting tool 12 cuts the workpiece either at the side cutting edge or at the bottom cutting edge depending on a portion of the workpiece to be machined, which results in the change of the cutting speed depending on the portion to be machined. Therefore, the roughness of the finished surface is not uniform depending on the portion. On the other hand, in the contour following machining, the change of the load on the cutting tool 12 and direction of the tool travel path is small, and the relatively stable machining can be obtained. Furthermore, in the contour following machining, the cutting speed is constant and the surface roughness is uniform since the cutting tool 12 cuts the workpiece at the same cutting edge. Thus, when fine finish is required, the contour following machining is preferred.

In FIG. 11, there are shown two schematic sections of a workpiece W and a cutting tool 12 during the cutting work across the axis thereof. FIG. 11-a shows down cutting and FIG. 11-b shows the up cutting. In the down cutting, the cutting tool 12 is fed in a direction indicated by the arrow 39 with the cutting edges 38 thereof cutting into the workpiece W in a reverse direction to the feed direction 39, as shown in FIG. 11-a. On the other hand, in the up cutting, the cutting tool 12 is fed in a direction indicated by the arrow 39 with the cutting edges 38 thereof cutting into the workpiece W in the same direction to the feed direction 39, as shown in FIG. 11-*b*.

In the down cutting, the cutting edges 38 cut the workpiece W by an appropriate cutting depth, which results in the fine machined surface. On the other hand, in the up cutting, the cutting edges 38 tend to cut the workpiece W by excessive cutting depth, which results in higher roughness of the machined surface than that obtained by down cutting. Furthermore, in the up cutting, there is higher heat generation during the cutting work since friction tends to occur between the cutting edges 38 and the workpiece W.

The down cutting has more advantages than the up cutting, and it is preferred to machine by down cutting as much as possible. In other words, the cutting tool 12 is preferably fed relative to the workpiece W so that the finished surface of the workpiece W is machined by down cutting. For example, in the case of pocket machining work, the ball-end mill is fed so that the finished inner surface of the pocket, is machined by the down cutting. And in grooving work, both sides of the cutting edges of the cutting tool 12 will cut the workpiece. That is, the down cutting is performed at one side of the groove, and the up cutting is performed at another side of the groove. In such case, the milling cutter 12 is fed relative to the workpiece W so that the surface to be finished with less roughness than the other is machined by down cutting.

Figure 12:
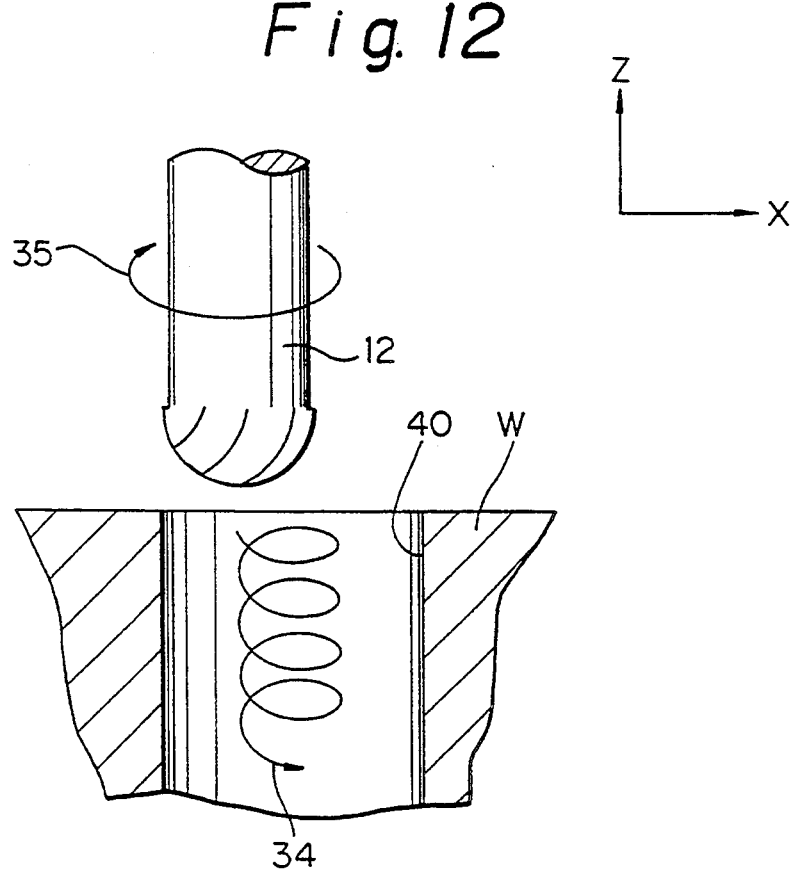
FIG. 12 explains boring work by a ball-end mill.

FIG. 12 illustrates boring work by a single ball-end mill having a substantially hemispherical cutting part. The ball-end mill 12 is fed in a spiral by rotating about the axis thereof in the direction 35. That is, the ball-end mill 12 is advanced in the Z-axis direction, and at the same time, is fed in a circle relative to the workpiece W in an X-Y plane by rotating about the axis thereof in direction 35. In this way, a bore 40 is machined on the workpiece by the ball-end mill 12 moving along the spiral path. The bore 40 can have a cylindrical inner surface or a conical inner surface.

To obtain a very fine surface, the shank of the ball-end mill 12 is made slightly smaller in diameter, than the cutting part so that the shank does not contact the finished surface. If usual square end mill is used in the same way, then the secondary cutting part thereof contacts with the machined surface, which increases the roughness of the machined surface. Furthermore, the heat generated during machining concentrates at the corners of the cutting edge, which also increases the finished surface roughness.

In this boring work, both the down cutting and the up cutting will be performed. The ball-end mill 12, however, is preferably fed relative to the workpiece W so that the finished surface is machined by down cutting as described above.

During boring work by the spiral machining, the depth of cut preferably does not exceed 0.1 D supposing that the diameter of the ball-end mill is D. This decreases the heat generation, as well as the volume of the chips per rotation of the ball-end mill 12, which ensures cooling at the cutting point. The high rotating rate and the high feeding rate of the end mill 12 compensate for the machining efficiency which is decreased by the small depth of cut.

Figure 13:
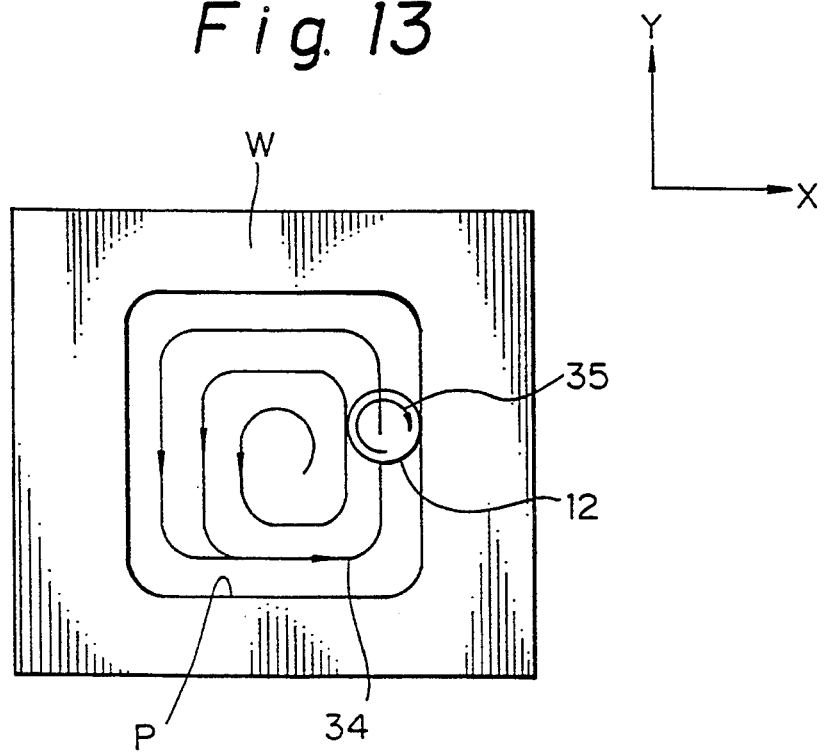
FIG. 13 explains cutting work for forming a pocket by a ball-end mill.

FIG. 13 illustrates pocket machining work by a single ball-end mill 12. A pocket P is machined by helical machining. In the helical path machining, the ball-end mill 12 is fed relative to the workpiece in a helical path in an X-Y plane as shown in FIG. 13.

The rotating ball-end mill 12 is firstly fed in a direction parallel to the Z-axis by the predetermined depth of cut at the substantially center of the pocket P. At the same time, the end mill 12 is fed in the X- or the Y-axis direction. When the predetermined depth is cut in the direction parallel to the Z-axis by the ball-end mill 12, the ball-end mill 12 is fed outwardly along the helical path 34 in a counter-clockwise direction from the center of the pocket P in the X-Y plane so that the desired channel, which is an intermediate channel of the finished pocket P, is obtained. The ball-end mill 12, in turn, cuts to a predetermined depth in the direction parallel to the Z-axis at substantially the center of the pocket P again. This process is repeated until the desired pocket P is machined. The ball-end mill 12 is preferably fed relative to the workpiece W in the X-Y plane so that the finished surface is machined by the down cutting.

It is also apparent that the end mill 12 can be fed inwardly from the outside of the pocket P along the helical path 34, though a helical path 34 moving out from the center of the pocket P is illustrated in FIG. 13.

Helical machining is also used for cutting in which the depth of cut does not exceed 0.1 D and the pick feed or the pitch of the spiral does not exceed 0.5 D so as to obtain a fine surface. In the prior art, however, the pocket machining work is usually used for cutting in which the depth of cut is relatively large (0.2–0.4D) and pitch of the spiral is relatively small (0.1 D). This produces, however, considerable heat generation, because of the large unformed chip, and in shorter tool life. In particular, this prior machining method is not suitable for cutting work to machine a material of high hardness.

The cutting mentioned above, that is, when the depth of cut does not exceed 0.1 D and the pick feed does not exceed 0.5 D, is also used for back-and-forth machining with high-pressure coolant described above.

In accordance with the present invention, it is possible to machine a workpiece of a material having high hardness and/or high toughness, that is, having low machinability, such as die steel or hardened steel. That is, the workpiece having low machinability can be machined by a single ball-end mill with the high-pressure coolant being applied to the main cutting part, in which depth of cut and the pick feed do not exceed 0.1 D and 0.5 D respectively. In other words, it is possible to machine the above material easily in accordance with the present invention, which can not be machined in prior art except by grinding or by electrical discharge machining.

The method of, and the apparatus for, machining a workpiece by cutting in accordance with the present invention are performed by means of a NC controlling system as in the prior art. The NC controlling system, in the prior art, requires the operator to input various data of the condition for cutting such as the tool travel path, the depth of cut, or the pick feed in addition to the shape and the dimension to be machined and the diameter and length of the cutting tool to be used. This input work is, however, troublesome and time consuming.

Programs for standard cutting work such as boring work, pocket work, or grooving work is executed frequently in the NC controlling system and this cutting work simple. Therefore, it is useful to standardize the programs for each cutting work as a subsidiary program.

Figure 14:
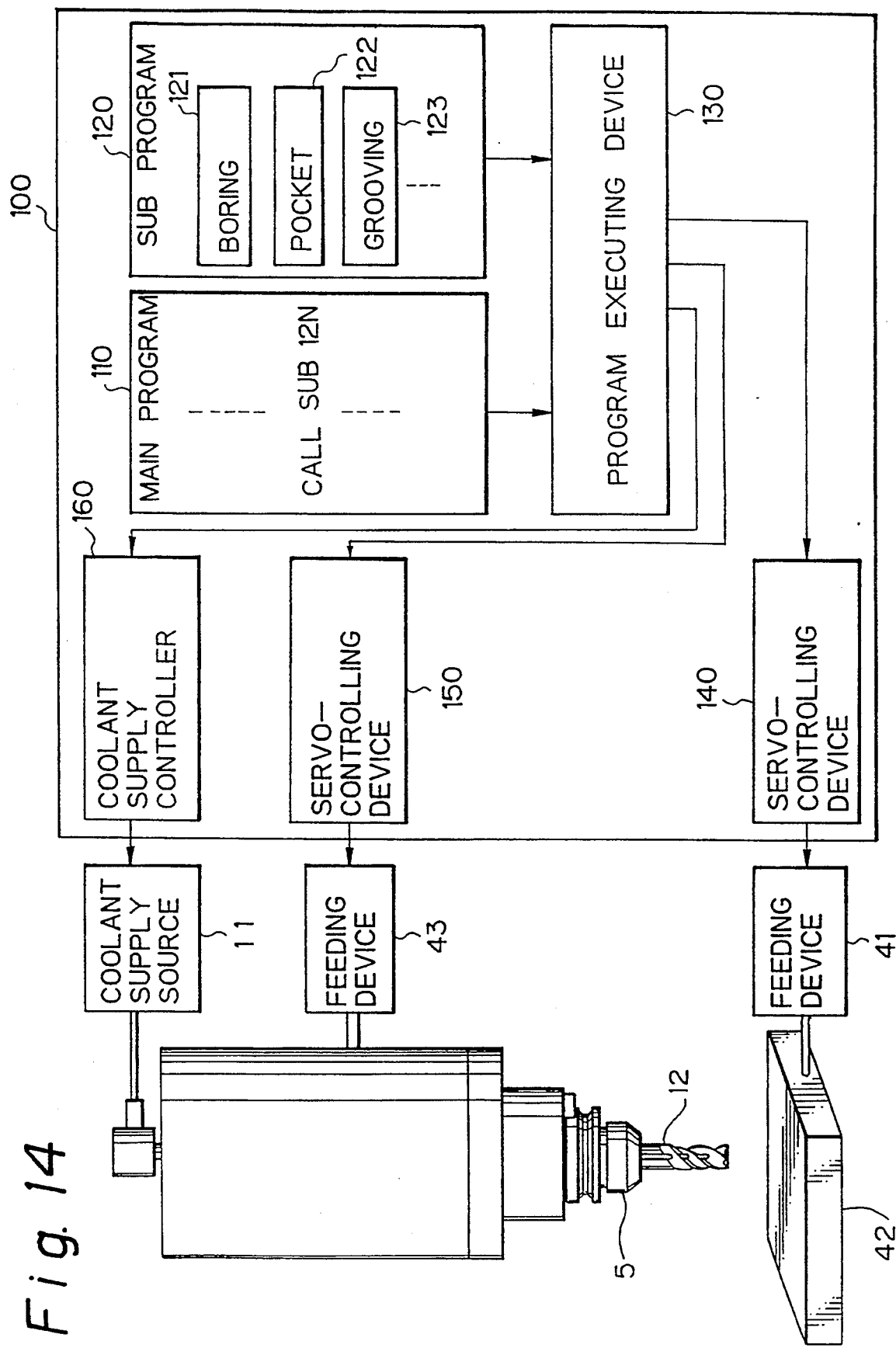
FIG. 14 is a schematic block diagram of a NC controlling system of the present invention.

Referring now to FIG. 14, there is illustrated a schematic block diagram of an NC controlling system in accordance with the present invention. The NC controlling system 100 comprises a main program 110, a subprogram 120, a program executing device 130, a servo-controlling device 140 for an X-Y table 42, a servo-controlling device 150 for Z-axis of the spindle, and a coolant supply controller 160.

The subprogram comprises a plurality of subsidiary programs 121, 122, 123, . . . , 12N for the respective standard cutting work described above such as boring work, pocket machining work, grooving work and etc.. The main program 110 is executed in the program executing device 130. And a subsidiary program 121, 122, 123, . . . , 12N is advantageously selected from the subprogram 120 by the main program 110 for the cutting work to be performed. The main program 110 and the subsidiary program 12N are executed in the program executing device 130. The servo-controlling devices 140 for the X-Y table 42, the servo-controlling device 150 for the Z-axis and the coolant supply controller 160 receive signals for controlling the respective controlled object from the program executing device 130.

The servo-controlling device 140 for the X-Y table 42 generates a controlling signal to a means 41 for feeding the cutting tool 12 relative to the workpiece (not shown in FIG. 14) fixed on the X-Y table 42. The feeding means 41 is composed of the usual feeding devices for the X-Y table 42 and comprises servo-motors and ball screws (not shown). The X-Y table 42 is fed in the X- and Y-axes direction by the device 41, whereby the cutting tool 12 is fed relative to the workpiece. The servo-controlling device 150 for Z-axis of the spindle generates a controlling signal to a means 43 for feeding the cutting tool 12 in the Z-axis direction. The feeding means 43 composed of the usual feeding devices and comprises a servo-motor and a ball screw (not shown). The coolant supply controller 160 generates a controlling signal to the coolant supply source 11 to control the pressure and the flow rate of the coolant to be supplied.

For example, in the case of boring work by a ball-end mill, the main program 110 selects and calls the subsidiary program 121 for the boring work. The NC controlling system 110 requires the operator to input the data, such as the diameter of the end mill to be used, and the inner diameter and the depth of the bore to be machined before the machining, whereby the appropriate boring work is performed automatically without specifying the condition of cut such as tool travel path or a depth of cut. The NC controlling system 110 does not require the tool travel path and the depth of cut since these data is programmed in the subsidiary program 121. The boring work will be performed, by down cutting, with the ball-end mill being fed relative to the workpiece along the spiral path, and high-pressure coolant jetting onto the main cutting part of the ball-end mill.

In the case of pocket machining work by a ball-end mill, the main program 110 selects and calls the subsidiary program 122 for the pocket machining work. The NC controlling system 110 also requires the operator to input the data, such as the diameter of the end mill to be used, and the dimension of the pocket to be machined before the machining, whereby the appropriate pocket work is performed automatically, by the down cutting, with the ball-end mill being fed relative to the workpiece along a helical path, and the high-pressure coolant jetting onto the main cutting part of the ball-end mill. The tool travel path, the depth of cut and pick feed is not required to be input.

Furthermore in the case of grooving work by a ball-end mill, the diameter of the end mill to be used, and the length, the width and depth of the groove to be machined are also input to the NC control device before the grooving work. Thus, the condition of cut, such as the depth of cut in the Z-axis direction not exceeding 0.1 D, the pick feed not exceeding 0.5 D, and the down cutting, are set automatically.

These subsidiary programs are preferably programmed by the programming function of the NC controlling device 110.

As described above, the method of, and the apparatus for, machining of the present invention can perform the various cutting work, such as boring work, pocket machining work and grooving work, at high machining efficiency and with fine surface roughness since high-pressure coolant removes heat and chips generated during the cutting work. Furthermore, longer tool life is obtained because of the positive heat removal. These effects lead to low manufacturing costs.

The high-pressure coolant jets onto the face of the main cutting part directly through the coolant passages provided around the outer surface of shank of the cutting tool without interruption by the cutting edges arranged between the coolant nozzle and the main cutting part or by the workpiece. The coolant passages are formed by at least one coolant channel extended from the rear end of the shank of the cutting tool to the region adjacent to the main cutting part of the cutting tool or by at least one coolant channels provided on the inner surface of the tool holder.

In accordance with the present invention, it is not necessary to change the position and the angle of the discharge of the coolant nozzle depending on the diameter or length of the cutting tool. This allows the apparatus to be automated easily.

Furthermore, the present invention employs a machining method in which a rotating cutting tool is fed in the Z-axis direction with the cutting tool being fed relative to a workpiece to be machined in the direction of the X- or Y-axis, along an inner contour of the workpiece to be machined or a helical or spiral tool path. The cutting tool cuts the workpiece, by down cutting, with the depth of cut in the Z-axis direction not exceeding 0.1 D and the pick feed not exceeding 0.5 D. In accordance with the present invention, the roughness of the machined surface and the machining efficiency are improved.

In accordance with the present invention, it is possible to machine a workpiece of a material having high hardness and/or toughness, that is, having low machinability, for example a die steel or a hardened steel.

Furthermore, in accordance with the present invention, the complicated input work is reduced by standardizing subsidiary programs for respective standard machinings such as boring work, pocket machining work and grooving work.

Furthermore, in accordance with the present invention, there are provided novel cutting tools such as an end mill, a ball-end mill, drill and milling cutter having at least one coolant channel provided on the outer surface thereof, The coolant channel allows high-pressure coolant to be directed in the form of a jet to the face of the main cutting part. The coolant channel can be formed with larger sectional area than that of the coolant passages extended in the cutting tool along the axis thereof as the prior art. This allows the high-pressure coolant to be directed with sufficient flow rate to remove the heat and chips generated during the cutting work.

The coolant channels are also easy to form on the outer surface of the cutting tool at lower costs. Furthermore, the cutting tools with the coolant channels have higher rigidity than that of the conventional cutting tools with a coolant passages extended in the cutting tools along the axis thereof.

Although the invention has been described with reference to certain and preferred embodiments, it would be apparent to people skilled in the art of machining or cutting tool that other variations are possible which are obvious thereover. These variations are intended to be included in the present specification and appended claims.

What is claimed is:

1. A method of machining a workpiece by a rotating cutting tool including a shank adapted to be inserted into a tool fitting bore of a tool holder, a cutting part integrally formed therewith and having a cutting edge terminated at a free end of said cutting tool, and at least one coolant channel extended on the outer surface of the cutting tool from the rear end of said shank to a region adjacent to said free end of said cutting tool, which method comprises the steps of:

supplying coolant into said tool fitting bore of said tool holder, said coolant having sufficient pressure and flow rate to remove heat and chips generated during said machining;

directing said coolant in the form of a jet from the rear end of said shank to substantially said free end of said cutting tool in a direction parallel to an axis of said cutting tool through said at least one coolant channel so that said coolant is directly applied onto the faces of said cutting edges at said free end of said cutting tool without interruption; and feeding said cutting tool relative to said workpiece in at least one direction corresponding to one of a plurality of feed axes.

2. The method of machining according to claim 1 wherein said cutting tool is fed relative to said workpiece in a direction parallel to said axis of said cutting tool, and at the same time fed along a tool path in a plane perpendicular to said axis of said cutting tool.

3. The method of machining according to claim 1 wherein said cutting tool is fed relative to said workpiece around a contour of said workpiece in a plane perpendicular to said axis of said cutting tool.

4. The method of machining according to claim 1 wherein said cutting tool is fed relative to said workpiece in a direction parallel to said axis of said cutting tool, and at the same time fed in a spiral path so that said workpiece is bored by down cutting, in said down cutting, said cutting edges are advanced into said workpiece in a reverse direction to a feed direction of said cutting tool.

5. The method of machining according to claim 1 wherein a ball-end mill is selected as said cutting tool, and depth of cut does not exceed one tenth of diameter of said ball-end mill.

6. The method of machining according to claim 5 wherein pick feed of relative motion between said ball-end mill and said workpiece does not exceed a half of said diameter of said ball-end mill.

7. The method of machining according to claim 1 said method further comprising a step of:

programming a NC program for controlling said machining, said NC program comprising a plurality of subsidiary programs for respective standard machinings, said standard machinings including at least boring work, pocket machining work and grooving work.

8. A method of machining a workpiece by a rotating a ball-end mill cutting tool including a shank adapted to be inserted into a tool fitting bore of a tool holder, and a cutting part integrally formed therewith and having cutting edges terminated at a free end of said cutting tool, which method comprises the steps of:

supplying coolant into said tool fitting bore of said tool holder, said coolant having sufficient pressure and flow rate to remove heat and chips generated during said machining;

directing said coolant in the form of a jet from the rear end of said shank to substantially said free end of said cutting tool in a direction parallel to an axis of said cutting tool; and feeding said cutting tool relative to said workpiece in at least one direction corresponding to one of a plurality of feed axes so that the depth of cut does not exceed one tenth of the diameter of said ball-end mill.

9. The method of machining according to claim 8 wherein said coolant is directed onto said free end of said cutting tool through at least one coolant channel provided on an outer surface of said cutting tool and extended from said shank to a region adjacent to said free end.

10. The method of machining according to claim 8 wherein said coolant is directed onto said free end of said cutting tool through at least one coolant channel provided in said tool holder and extended in a direction parallel to said axis of said cutting tool.

11. The method of machining according to claim 8 wherein pick feed of relative motion between said ball-end mill and said workpiece does not exceed a half of said diameter of said ball-end mill.

12. An apparatus for machining a workpiece by a rotating cutting tool including a shank adapted to be inserted into a tool fitting bore of a tool holder, and a cutting part integrally formed therewith and having cutting edges terminated at a free end of said cutting tool, and at least one coolant channel extended on the outer surface of the cutting tool from the rear end of said shank to a region adjacent to said free end of said cutting tool, which apparatus comprises:

means for supplying coolant into said tool fitting bore of said tool holder, said coolant having sufficient pressure and flow rate to remove heat and chips generated during said machining;

means for directing said coolant in the form of a jet from the rear end of said shank to substantially said free end of said cutting tool in a direction parallel to an axis of said cutting tool through said at least one coolant channel so that said coolant is applied onto the faces of said cutting edges at said free end of said cutting tool without interruption; and means for feeding said cutting tool relative to said workpiece in at least one direction of corresponding to one of a plurality of feed axes.

13. The apparatus for machining according to claim 12 wherein said coolant supplying means comprises:

a coolant supply source for pressurizing said coolant to a predetermined pressure;

a first coolant passage means provided in a spindle for rotating said cutting tool about said axis thereof and communicated to said coolant supply source means; and a second coolant passage means provided in said tool holder and communicated to said first coolant passage means and said tool fitting bore.

14. A cutting tool for machining a workpiece by cutting comprising:

a shank adapted to be inserted into a tool fitting bore of a tool holder;

a cutting part integrally formed with said shank and having twisted cutting edges terminated at a free end of said cutting tool, said cutting edges substantially performs cutting action at said free end; and at least one coolant channel on an outer surface of said cutting tool extended toward said free end from a rear end of said shank in a direction parallel to an axis of said cutting tool, and an opening of said respective at least one coolant channel facing to a face of said respective cutting edges at said free end of said cutting tool.

15. The cutting tool according to claim 14 wherein said cutting tool is a ball-end mill.

16. The cutting tool according to claim 15 wherein said at least one coolant channel is provided corresponding to a number of said cutting edges of said ball-end mill.

17. The cutting tool according to claim 14 wherein said cutting tool is an end mill, and said at least one coolant channel is extended to said cutting edges arranged between said shank and said free end thereof.

18. The cutting tool according to claim 14 wherein said cutting tool is a drill, and said at least one coolant channel is extended to said cutting edges of said drill arranged between said shank and said free end thereof.

* * * * *